H. R. PENNINGTON.
ELECTRIC WELDING APPARATUS AND METHOD OF REGULATING THE SAME.
APPLICATION FILED APR. 22, 1918.

1,378,192.

Patented May 17, 1921.

Witness:
Leonard W. Novander.

Inventor
Harry R. Penington
By Sheridan, Jones, Sheridan + Smith
Attys

UNITED STATES PATENT OFFICE.

HARRY R. PENNINGTON, OF KANSAS CITY, MISSOURI.

ELECTRIC WELDING APPARATUS AND METHOD OF REGULATING THE SAME.

1,378,192. Specification of Letters Patent. Patented May 17, 1921.

Application filed April 22, 1918. Serial No. 229,927.

*To all whom it may concern:*

Be it known that I, HARRY R. PENNINGTON, a citizen of the United States, residing at Kansas City, in the county of Jackson and State of Missouri, have invented certain new and useful Improvements in Electric Welding Apparatus and Methods of Regulating the Same, of which the following is a specification.

My invention relates to improvements in electric welding apparatus and to the method of regulating the same.

The welding is accomplished by striking an arc between an electrode and the work to be welded. The electrode is held by the operator at substantially a uniform distance from the work, the molten metal being transferred from the electrode or stick of metal to the work. In order to prevent the arc from being extinguished whenever the operator draws the electrode too far from the work, it is customary to operate with a circuit having an open circuit voltage considerably in excess of the voltage impressed across the arc. The remaining voltage, in certain cases heretofore, has been taken up in the form of a voltage drop across a rheostat. However, this system is wasteful, much energy being dissipated in the form of heat. Other systems which have been developed have other disadvantages.

The object of the present invention is to provide welding apparatus and a method of regulating which are more efficient than those which have previously been employed. Contributory objects are to provide means whereby a self-excited dynamo may be so regulated as to produce any watt output in the welding arc up to the capacity of the machine in any desired combination of voltage and amperage; to provide means for suppressing the heavy rush of current when an arc is struck; to provide means whereby the arc may be reëstablished as often as desired with substantially the same amount of heat developed; to provide means whereby the arc is comparatively quiet and easy to maintain as distinguished from one which is accompanied by a violent spluttering, disquieting to the operator, and which goes out frequently unless great care is exercised in the use of the electrode; and to provide a system in which a comparatively smooth, even load is maintained on the prime mover despite necessary irregularities in the welding operation.

In the diagrams I have illustrated two embodiments of the invention.

Figure 1:
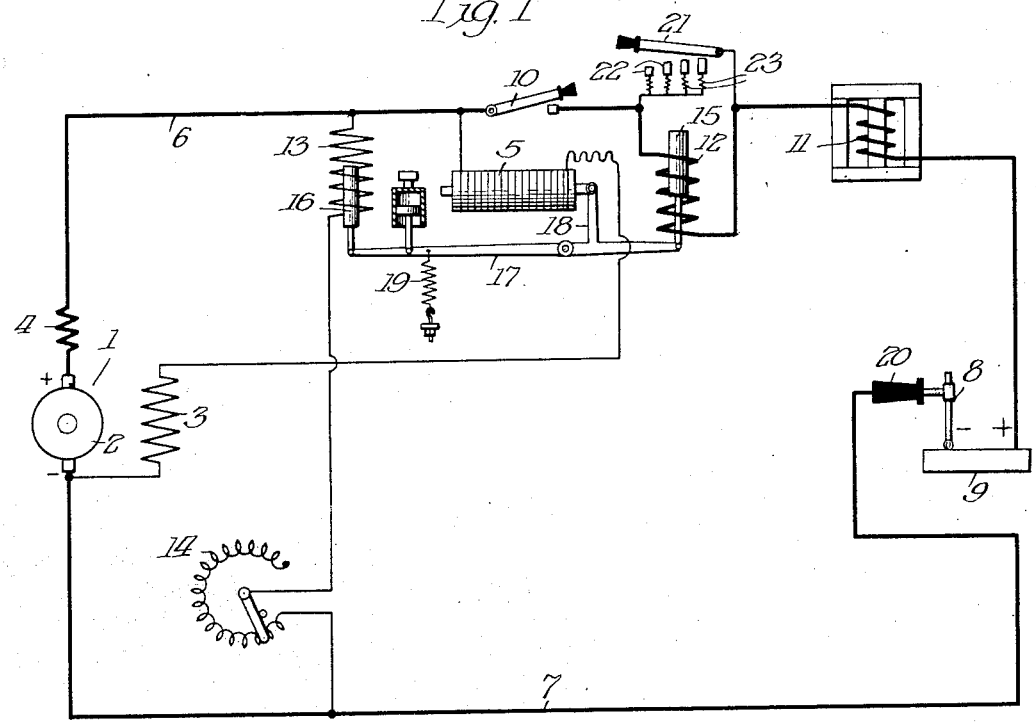
Figure 1 shows the preferred embodiment of the invention.

The welder is supplied with current from a self-excited dynamo 1, which is substantially a standard shunt-wound machine consisting of an armature 2 and a shunt field winding 3, a few series turns 4 being also provided around the shunt field coils. The generator field strength is regulated by means of a rheostat 5 in the form of a compressible carbon plate resistance. The circuit from the generator includes the conductors 6, 7, which are connected to the welding electrode 8 and the work-piece 9. A switch 10 is provided in the main circuit for connecting and disconnecting the welder to the dynamo. A reactance coil 11 is also connected in the main circuit.

The resistance of the carbon rheostat 5 and hence the generator field strength are controlled jointly by a series coil 12 connected in the main circuit and by a shunt coil 13 connected across the generator terminals through a rheostat 14. Said coils are preferably in the form of solenoids having cores 15, 16, respectively, connected to the pivoted link 17 and arm 18 in such manner that upon the energization of either of said solenoids, and disregarding the effect of the other, said lever is rocked in such a direction as to relax the pressure on the carbon rheostat 5, thereby increasing the resistance in series with the generator field circuit whereby said field is weakened. However, the relation of the current and voltage coils 12, 13, is such that their combined ampere turns are maintained constant, that is, as the current increases in the current coil, the potential automatically decreases at the generator terminals and hence across the voltage coil and also across the welding arc and vice versa. The joint action of these coils may either increase or decrease the generator output. The action of these solenoids is opposed by the spring 19 which tends to maintain the field resistance at a minimum value, and which is adjusted to insure a minimum open circuit voltage across the generator terminals and also across the potential coil 13, under which circumstances the pull of the core of said solenoid will just balance the pull of the spring 19 and the regulator tends to maintain constant open circuit voltage.

The electrode 8 is held by the operator by means of a handle 20, whereby the arc may be struck by simply touching the electrode to the work and thereafter holding the electrode at such a distance from the work as to cause the fused metal from the tip of the electrode to be deposited on the work in the desired manner. As soon as the operator causes a short circuit by touching the electrode to the work, there is a tendency toward a heavy rush of current through the circuit which, if permitted, would instantly fuse the end of the electrode to the work, eliminating the arc, resulting in an immediate cooling of the metal, causing the electrode to stick to the work and requiring it to be broken off. The reactance 11 is placed in the circuit to prevent the said heavy rush of current and give the operator time to withdraw the electrode. In addition, said reactance causes a momentary counter-electro-motive force which not only opposes the heavy rush of current, but also gives the regulator coils time to adjust the resistance of the carbon rheostat 5 to the desired value for the new load. The sudden rush of current, when an arc is struck, increases the energization of the series solenoid 12, causing it to pull down its core 15, thereby relaxing the pressure on the carbon rheostat and increasing the generator field resistance to hold the current within predetermined limits. The series coils 4 in the dynamo are provided to prevent a reversal of the polarity of the dynamo and hence a reversal in the flow of current in the circuit when the operator touches the electrode to the work and thereafter withdraws it in striking an arc.

For the purpose of explaining the operation of the apparatus, it may be assumed that the dynamo has a capacity of approximately 5 kilowatts and is driven from any suitable source of power sufficient to maintain approximately a constant full load speed. A motor or gas engine may be used, for example, as the prime mover. The open circuit voltage of the welder may be assumed to be adjusted to 40 volts by means of the rheostat 14, said rheostat varying the strength of the voltage controlling solenoid 13 with which it is in series. A one-eighth inch electrode may be assumed to require a potential of 18 volts and a current of 120 amperes to produce the proper heat in the arc under given conditions. Disregarding the small line drop, the potential across the voltage coil 13, being substantially the same as the voltage across the arc, would be 18 volts which is 22 volts less than the open circuit voltage.

The regulator automatically regulates the generator to insure the required 18 volts and no more unless the arc is lengthened. This regulation is effected in part through the hand switch 21, which is used to shunt a portion of the current around the series coil 12. Said switch coöperates progressively with a series of contacts 22, whereby the circuit may be closed through one or more resistances 23. As a result, the series coil 12 is weakened as more resistances are included in the branch circuits. In the practical operation of the device, the operator before striking the arc would partially close the switch 21 permitting a current of 70 amperes, for example, to be shunted around said coil, whereby the remaining current of 50 amperes would flow therethrough. The first rush of current having been suppressed, as previously explained, the desired regulating current of 50 amperes is attained smoothly and almost immediately after the arc is struck. This current building up quickly in the series coil 12, energizes the latter sufficiently to relax the pressure of the carbon resistance, thereby weakening the generator field which in turn causes a drop in the terminal voltage from 40 volts to the desired value of 18 volts. As the energization of the series coil increases, the energization of the voltage coil decreases due to the 22 volt decrease in terminal voltage, the combined effective ampere turns of said two coils, however, remaining constant.

Under conditions where a higher open circuit voltage is desirable in order to stabilize the arc, the operator first adjusts the rheostat 14 to increase its resistance. This decreases the energization of the voltage coil 13, permitting the spring 19 to decrease the resistance of the carbon rheostat 5, thereby strengthening the generator field and raising the terminal voltage to the corresponding value. Thereafter, the switch 21 is adjusted to such a position as to divert less current around the series coil 12, whereby the energization of the latter is increased sufficiently to offset the increased drop in voltage from open circuit voltage to operating voltage.

Where a lower open circuit voltage is desirable, the reverse operation is effected. The regulator also permits adjustment of the current to any desired value for any given working voltage within reasonable limits. This adjustment is effected merely by adjustment of the switch 21, whereby the strength of the coil 12 is varied, the adjustment of the voltage coil 13 remaining unaltered. It is desirable to make this adjustment in the current, owing to different working conditions, such as variations in the size and the material of the electrode, the kind of work being performed and whether the metal is being deposited by flowing down onto the work or laterally against the side of the work or upwardly against the bottom of the work. The operator determines from experience the proper heat for the particular work in hand, judging largely by the appearance of the fused metal. The automatic regulation is such that for any given length of arc and with the proper heat determined by the operator, the voltage is automatically maintained at the proper value to insure the proper heating effect.

In view of the above regulation, it will be seen that once the apparatus has been set for the right heat and the electrode held in the proper position, the arc can be reestablished as often as desired and the regulator will operate to provide substantially the same heat in the arc in every case, provided the electrode is held at a uniform distance from the work.

The fact that the speed of the dynamo is such that the pressure on the carbon plates is somewhat relaxed regardless of the load on the welding machine, makes it possible for the regulator to automatically compensate for any change in speed of the dynamo armature, due to any speed variation in the prime mover. The regulator also compensates for any change in the resistance of the machine windings, due to the temperature rise. Any similar rise in the voltage coil is very slight, owing to the use of the resistance wire, part of which is always in circuit. If the machine is placed on short circuit and allowed to remain so, the current will fall below normal, thus safe-guarding the machine against over-load. The variable voltage feature of the equipment makes it possible for the electrode to be drawn quite a distance from the work, without the arc being extinguished, for the reason that the voltages automatically increase as the arc lengthens. This is a great advantage to the operator as it is almost impossible to hold the electrode the same distance from the work at all times.

Figure 2:
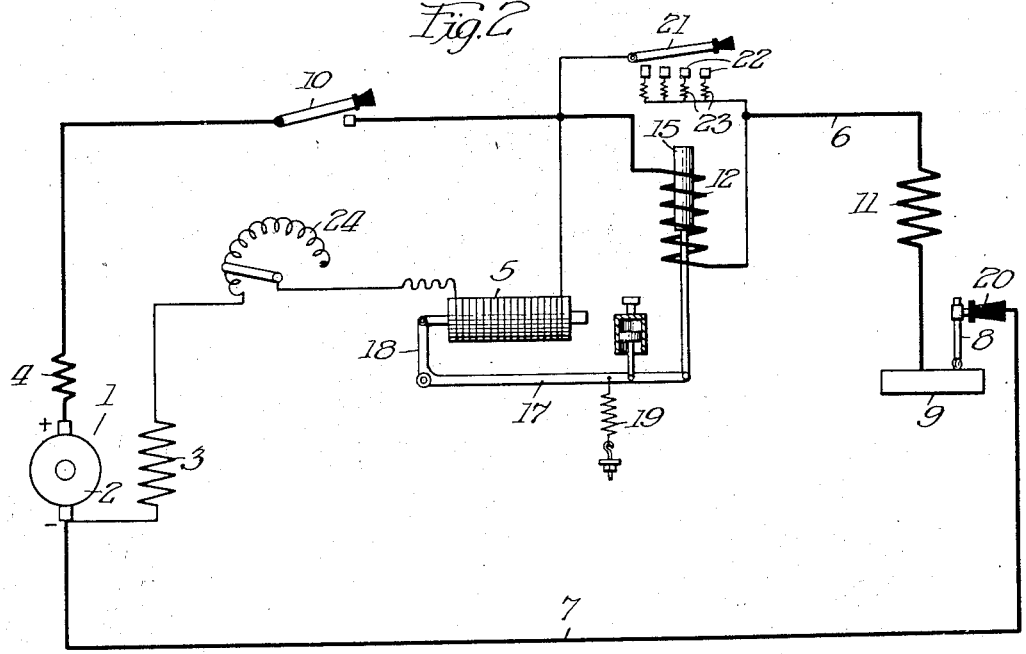
Fig. 2 shows a modification thereof.

Under certain conditions, the voltage or regulating coil may be omitted, such modified apparatus being illustrated in Fig. 2, wherein the same reference characters are employed as have been used in Fig. 1 where corresponding parts are shown.

It will be seen that the energization of the current coil 12 increases upon an increased flow of current, thereby automatically increasing the resistance of the carbon pile 5 and decreasing the generator field strength, whereby the dynamo 1 tends to deliver substantially constant current. The open circuit voltage is adjusted by means of the rheostat 24 which is in series with the generator field 3 and with the carbon rheostat 5. The heating circuit is adjusted by means of the switch 21. If the arc is lengthened, its resistance increases, the current in the regulating coil decreases, whereby the generator field strength is increased and the terminal voltage raised sufficiently to maintain the arc and to restore the current to its former value, thereby maintaining the required heat in the arc.

What I claim is:—

1. Welding apparatus comprising a generator having a shunt field winding, a variable pressure rheostat in series therewith, an arc welding device and conductors connecting the same to said generator, a current responsive coil in the main circuit arranged to vary the resistance of said rheostat to control the energization of said shunt field winding, a reactance coil also connected in the welding circuit, and means for shunting a variable amount of current around said current coil to vary the energization thereof.

2. Welding apparatus comprising a dynamo having a shunt field winding, a rheostat in series with said shunt field, a welding electrode in the main generator circuit, a current regulating coil also connected in said circuit, and a voltage regulating coil connected across the generator terminals, said coils acting conjointly to control said rheostat during the operation of said apparatus.

3. Welding apparatus comprising a dynamo having a shunt field winding, a rheostat in series with said shunt field, a welding electrode in the main generator circuit, a current regulating coil also connected in said circuit, a voltage regulating coil connected across the generator terminals, said coils acting conjointly to control said rheostat, and a reactance coil also connected in series in said generator circuit to prevent a sudden rush of current when the arc is struck.

4. Welding apparatus comprising a dynamo, means for regulating the field strength thereof, a circuit leading from said dynamo, an arc welding device in said circuit, a regulator for said dynamo comprising coöperating voltage and current responsive coils, means for adjusting said voltage coil for the desired open circuit generator terminal voltage, and means for shunting a variable amount of current around said current responsive coil to regulate the welding current in the arc.

5. Welding apparatus comprising a shunt field dynamo, a circuit leading therefrom, a welding device connected in said circuit, a reactance coil also connected in said circuit to limit the rush of current when the welding arc is struck, and auxiliary windings in said generator to prevent reversal of current flow in the circuit when said arc is struck.

6. Welding apparatus comprising a dynamo having a shunt field winding and a small series winding associated therewith, a rheostat to control the energization of said shunt field winding, a current responsive and a voltage responsive coil acting conjointly to control said rheostat, and an arc welding device in the external circuit of said generator.

In testimony whereof, I have subscribed my name.

HARRY R. PENNINGTON.